US012615171B2

(12) United States Patent
Mehnert

(10) Patent No.: US 12,615,171 B2
(45) Date of Patent: Apr. 28, 2026

(54) CLASSIFICATION OF IMAGE DATA WITH ADJUSTMENT OF THE DEGREE OF GRANULATION

(71) Applicant: Robert Bosch GmbH, Stuttgart (DE)

(72) Inventor: Jens Eric Markus Mehnert, Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 472 days.

(21) Appl. No.: 18/000,568

(22) PCT Filed: Jun. 2, 2021

(86) PCT No.: PCT/EP2021/064833
§ 371 (c)(1),
(2) Date: Dec. 2, 2022

(87) PCT Pub. No.: WO2021/245156
PCT Pub. Date: Dec. 9, 2021

(65) Prior Publication Data
US 2023/0230335 A1 Jul. 20, 2023

(30) Foreign Application Priority Data

Jun. 4, 2020 (DE) ..................... 10 2020 206 994.8

(51) Int. Cl.
| | |
|---|---|
| *G06V 10/42* | (2022.01) |
| *G06V 10/20* | (2022.01) |
| *G06V 10/44* | (2022.01) |
| *G06V 10/52* | (2022.01) |
| *G06V 10/764* | (2022.01) |
| *G06V 10/774* | (2022.01) |
| *G06V 10/82* | (2022.01) |
(Continued)

(52) U.S. Cl.
CPC ........ *H04L 12/40032* (2013.01); *G06V 10/20* (2022.01); *G06V 10/431* (2022.01); *G06V 10/454* (2022.01); *G06V 10/52* (2022.01);

*G06V 10/764* (2022.01); *G06V 10/774* (2022.01); *G06V 10/82* (2022.01); *G06V 20/56* (2022.01);
(Continued)

(58) Field of Classification Search
CPC .................................................. H04L 12/40032
See application file for complete search history.

(56) References Cited

U.S. PATENT DOCUMENTS

2018/0174047 A1* 6/2018 Bourdev ................ G06V 10/82

FOREIGN PATENT DOCUMENTS

DE 10 2017 211 331 A1 1/2019

OTHER PUBLICATIONS

Lohdefink, et al, "On Low-Bitrate Image Compression for Distributed Automotive Perception: Higher Peak SNR Does Not Mean Better Semantic Segmentation", Jun. 2019, IEEE, pp. 424-431 (Year: 2019).*
(Continued)

*Primary Examiner* — Edward Park
(74) *Attorney, Agent, or Firm* — Maginot, Moore & Beck LLP

(57) ABSTRACT

A device for classifying image data includes a trainable pre-processing unit configured to retrieve, from a trained context, and based on the image data, at least one specification in terms of how a degree of granulation of the image data is to be reduced, and to reduce the degree of granulation of the image data in accordance with the at least one specification. The device further includes a trainable classifier configured to map the granulation-reduced image data onto an assignment to one or more classes of a specified classification.

7 Claims, 4 Drawing Sheets

(51) Int. Cl.

| | |
|---|---|
| *G06V 20/56* | (2022.01) |
| *G06V 20/58* | (2022.01) |
| *H04L 12/40* | (2006.01) |
| *G06V 40/10* | (2022.01) |

(52) U.S. Cl.
CPC ............ *G06V 20/58* (2022.01); *G06V 20/582* (2022.01); *G06V 40/103* (2022.01)

(56) References Cited

OTHER PUBLICATIONS

International Search Report corresponding to PCT Application No. PCT/EP2021/064833, mailed Sep. 10, 2021 (German and English language document) (7 pages).

Rahmani et al., "A Novel Network Design for Future IP-Based Driver Assistance Camera Systems," IEEE International Conference on Networking, Sensing and Control, Mar. 2009, pp. 457-462 (6 pages).

Torfason et al., "Towards Image Understanding from Deep Compression without Decoding," arxiv.org, Cornell University Library, Mar. 16, 2018, pp. 8-9 (17 pages).

Lohdefink et al., "On Low-Bitrate Image Compression for Distributed Automotive Perception: Higher Peak SNR Does Not Mean Better Semantic Segmentation," 2019 IEEE Intelligent Vehicles Symposium, Jun. 9, 2019, pp. 424-431 (9 pages).

Suzuki et al., "Image Pre-Transformation for Recognition-Aware Image Compression," 2019 IEEE International Conference on Image Processing, Sep. 22, 2019, pp. 2686-2690 (5 pages).

Dong et al., "CDC: Classification Driven Compression for Bandwidth Efficient Edge-Cloud Collaborative Deep Learning," arxiv. org, Cornell University Library, May 4, 2020 (7 pages).

* cited by examiner

CLASSIFICATION OF IMAGE DATA WITH ADJUSTMENT OF THE DEGREE OF GRANULATION

This application is a 35 U.S.C. § 371 National Stage Application of PCT/EP2021/064833, filed on Jun. 2, 2021, which claims the benefit of priority to Serial No. DE 10 2020 206 994.8, filed on Jun. 4, 2020 in Germany, the disclosures of which are incorporated herein by reference in their entirety.

The disclosure relates to a device for the classification of image data which can be used in particular for the at least partially automated driving of vehicles in traffic.

BACKGROUND

In order to be able to safely drive a vehicle in road traffic, continuous monitoring of the vehicle surroundings is essential. Corresponding sensors provide images of different modalities. In order to obtain information therefrom about the traffic situation which can be further processed by machine, trainable classifiers are used. Such classifiers process the image data for an assignment to one or more classes of a specified classification. The classes can for example represent traffic signs or other objects which can be recognized in the images.

In many cases, the captured images cannot be used immediately for the classification, but must first be pre-processed. DE 10 2017 211 331 A1 discloses a system comprising a pre-processing module which can be trained in a targeted manner in order to work out the information relevant for the actual processing of the images.

SUMMARY

Within the scope of the disclosure, a device for the classification of image data has been developed. This device comprises a trainable pre-processing unit. On the basis of the image data, the pre-processing unit is designed to retrieve from a trained relationship at least one specification of the extent to which the level of detail of the image data is to be reduced, and to reduce the level of detail of the image data accordingly. The device further comprises a classifier which is designed to map the detail-reduced image data onto an assignment to one or more classes of a specified classification.

In this context, the term "classification" also includes a semantic segmentation of the image, pixels or other partial areas of an image The image data can be, for example, camera images, video images, radar images, ultrasound images or LIDAR images. These are the imaging modalities which are used individually or in combination most frequently for monitoring the surroundings of vehicles.

The assignment to one or more classes can be, for example, a "one-hot" vector which has a component different from zero only for one of the available classes. However, the assignment can also be, for example, a softmax vector, which assigns a plurality of classes of zero different confidences and/or probabilities which add up to 1 overall.

A trainable pre-processing unit or a trainable classifier is considered, in particular, to be a module which embodies a function which is parametrized using adjustable parameters and has a great power to generalize. During training of such a module, the parameters can be adapted in particular in such a way that respective learning inputs from the respective module or from the device as a whole are mapped as well as possible onto previously known associated learning outputs. The pre-processing unit, or the classifier, can in particular include an artificial neural network, ANN, and/or may be an ANN.

It has been recognized that a maximum richness of detail of the image data does not in itself provide a guarantee of a correct assignment of the image data to classes by the classifier. It is rather the case that at a given training level, which is characterized in particular by the type, composition and quality of the training data and the number of training periods, a trainable classifier can only usefully process images having a certain level of detail. If images having a higher level of detail are supplied, for example by replacing a camera sensor with a new camera sensor having a higher pixel resolution, the accuracy of the classification will not be further increased. In fact, the accuracy can even suffer if the increase in the resolution is not also accompanied by a quantitative and/or qualitative increase in the training The higher pixel resolution can prove to be a "gateway" for image noise, and even for targeted attacks with "adversarial examples". The latter are manipulations specifically introduced into image data, which may not be noticed at all by a human observer of the image, but can cause a classifier to assign the image to one or more other classes.

Thus, for example, a certain training level can suffice for reliably classifying images with the typical level of detail of a full HD image (1920×1080 pixels). In order to reliably classify images with the typical level of detail of a 4K image (4096×2160 pixels), however, longer training, training with a greater variability of the training data, and/or training with less label noise in the training data may be necessary. In a situation in a specific use of a classifier, in which the training level of the classifier is specified, the subsequent reduction in the level of detail can prevent the susceptibility to image noise or "adversarial examples", caused by excessive detail, coming into effect.

Accordingly, proceeding from an application situation in which a sensor to be used for the image recording and a classification task are present, outlay for obtaining training data can be saved. If, for example, a camera is selected which provides detail that is excessive for the specific task, the subsequent reduction in the level of detail can cause the training to be created using fewer training data, except for a specified accuracy to be achieved in the classification task than would otherwise be necessary for the selected resolution of the camera.

The detection of pedestrians can be cited as an illustrative example. Since pedestrians are the weakest road users, it is essential to recognize each pedestrian as such. In contrast, it is not important how the pedestrian is dressed, whether the clothing contains printed patterns, shoulder pads or other accessories, or what physique the pedestrian has. The level of detail in the image data can thus be hugely reduced without accuracy in the identification of pedestrians in traffic situations decreasing.

The lower level of detail in turn means that the hardware of the classifier can be dimensioned more economically. If fewer details are to be processed overall, the ANN of the classifier can be implemented, for example, on a smaller computing unit (for instance a GPU) which costs less and also consumes less energy.

Reducing the level of detail can, in particular, be accompanied by the fact that simple changes, and here in particular changes in individual image pixels, are leveled out. The classifier then no longer reacts to such changes.

In order to reduce the level of detail, it is possible in principle to use any transfer function characterized by one or more optimizable parameters. For example, certain image regions which are not important for the classification can be masked. In particular, this example shows that the reduction of the level of detail that is optimal for the respective application is specific for each image. It is therefore important that specification of the extent to which the level of detail is to be reduced is retrieved anew for each image from the trained relationship.

In a particularly advantageous embodiment, the pre-processing unit and the classifier are designed as a common artificial neural network, ANN. This facilitates joint training of the two modules "hand-in-hand", because the required level of detail can, for example, also depend on the type of object to be detected. As explained above, the specific shape of a pedestrian is generally not relevant to his/her recognition. On the other hand, it is important, for example, to distinguish, from the shape of a vehicle, whether it is an automobile or a truck, because these vehicle types differ fundamentally in their driving dynamics.

The design as a common ANN does not require the pre-processing unit and the classifier to be implemented in a common assembly or otherwise be spatially adjacent in hardware. Instead, what is essential is that the part of the common ANN forming the pre-processing unit and the part of the ANN forming the classifier should be connected to one another in terms of data technology, so that the parameters of both parts of the ANN can be trained together.

The reduction in the level of detail can be used in particular in the monitoring of the surroundings of vehicles, in order to save transmission bandwidth within the vehicle. The level of detail can already be reduced in the vicinity of the respective sensor by the pre-processing unit. The detail-reduced image data will then have a significantly smaller volume and/or, due to their smaller information content, can be compressed to a significantly smaller volume for transmission within the vehicle to the classifier.

For this reason, in a further particularly advantageous embodiment, the pre-processing unit is connected via a dedicated broadband connection to at least one image source carried by a vehicle. The pre-processing unit is connected to the classifier via a bus system of the vehicle, which is used by further on-board systems of the vehicle.

Most modern vehicles are equipped with a CAN bus or other bus system to which a plurality of further vehicle systems are connected. Such a bus system enables all connected bus users to communicate with one another. In contrast to the earlier harnesses of dedicated cables between in each case two bus users which are communicating with one another, this saves considerable wiring complexity. The price for this is, however, that the connected bus users must share the bandwidth of the bus system. As a rule, only one bus user can transmit at any one time. If the entire vehicle surroundings are now monitored using a plurality of sensors (such as high-resolution cameras), large quantities of data will be generated, which may no longer be able to be transmitted in their entirety via the bus system. Even a "high-speed" CAN bus has only a maximum of 1 Mbit/s bandwidth, which is already not enough for a full-HD video data stream. However, by virtue of the level of detail being significantly reduced before transmission via the bus system, and the data thus being compressed in a lossy manner, the bandwidth will suffice even for the transportation of the data obtained from a plurality of cameras and compressed in the same manner. For this purpose, the pre-processing unit can, in particular, be part of a sensor module for capturing image data from vehicle surroundings.

In a particularly advantageous embodiment, the pre-processing unit is designed to transform the image data into a representation in a working space, and to reduce the level of detail of this representation. If, in the working space used, the details important for the particular application can be differentiated particularly well from the less important details, in this way more important details can be kept and more unimportant details can be ignored. The representation can then, for example, be re-transformed back into the space to which the original image data also belong. This has the advantage that the classifier itself does not have to be changed, but can continue to operate as though the original image data were supplied to it. However, the representation can also be further processed, for example, directly by the classifier. This is particularly advantageous when back-transformation into the space of the original image data is more difficult or even not obviously possible.

In a particularly advantageous embodiment, the pre-processing unit is designed to determine the representation in the working space as a linear combination of basic functions of the working space characterized by a set of coefficients. The pre-processing unit is further designed to retrieve, from the trained relationship, on the basis of the image data, at least one specification regarding which coefficients are to be reduced in terms of magnitude or eliminated, and to reduce or eliminate coefficients of the representation according to this specification.

In a particularly advantageous embodiment, the pre-processing unit is designed to determine the representation in the working space as a linear combination of wavelets characterized by a set of wavelet coefficients. Wavelets are functions that differ from zero only in a limited region of their (spatial) definition range. One wavelet ("mother wavelet") can in particular generate, for example, an entire system of functions on different size scales, which can then be used for multi-scale analysis of the image data. Wavelets are furthermore characterized by useful contents of images being typically concentrated only in a few wavelet coefficients which are large in terms of magnitude, while for example white noise is spread out over many wavelet coefficients that are small in terms of magnitude.

In order to reduce the level of detail, for example in particular wavelet coefficients which relate to larger spatial image regions can be preferred over wavelet coefficients which relate to finer details. The image components that are preferred in this way are particularly robust in relation to noise in the original image and also in relation to distortions of the original image with an "adversarial example". That is to say, noise or the manipulation with the "adversarial example" is leveled out by the pre-processing unit and no longer reaches the classifier.

Instead of the wavelet transformation, the discrete cosine transform or the Fourier transform can also be used, for example.

In a particularly advantageous embodiment, the pre-processing unit is designed to retrieve, as a specification, a numerical fraction of the coefficients which are to be reduced in terms of magnitude or eliminated. The learned relationship can therefore suggest, for example, taking into account certain images in all their details, but deleting 50% or more of the details in other images.

For example, the pre-processing unit can learn that all details of a clear sharp image can be taken into account, while an image that is blurred or indistinct for other reasons is to be significantly reduced in its level of detail. As a result, it is possible to prevent, for example, noise in such a blurred image suggesting the presence of important details which are in reality not there at all.

The numerical fraction of the coefficients which are to be reduced in terms of magnitude or eliminated can be determined in particular, for example, using the entropy of the image data.

It is also possible, for example, to define a fixed quota for coefficients which are not to be changed, which can then also be defined again, for example as a function of the size scale of the wavelet. For example, the number of coefficients which are not to be changed can thus be defined in a hyperparameter a for the largest size scale (order 0) and then for smaller size scales (order i=1, 2, 3, . . . ) to a$^i$, whereby rounding to the next-largest integer is required.

Alternatively, the pre-processing unit can also be designed to retrieve, on the basis of the image data from the trained relationship, a dimensionality for a latent space of an autoencoder as a working space, and to transform the image data into this working space using the autoencoder. In this context, an autoencoder is a trainable module that converts the image data into a representation having a significantly reduced dimensionality. This representation can then be re-translated by an associated decoder back into image data which are very similar to the original image data. Typically, the encoder and the decoder are trained together for the aim of the back-translated image data being as similar as possible to the original image data.

In this embodiment, the dimensionality for the latent space is the fine-tuning instrument as regards the level of detail of the image data. The representation in the latent space as the working space can be further processed directly by the classifier. However, the back-translated image data can also be further processed by the classifier.

The assignment of the image data, supplied by the device, to one or more classes, can be evaluated in any desired manner, for example in a vehicle by a driver assistance system and/or a system for at least partially automated driving, and can form the basis for the planning of driving maneuvers. In particular, the device can be used as a data source for any such systems.

The disclosure also relates to a method for training specifically that embodiment of the device in which the pre-processing unit transforms the image data into a representation in a working space (for instance space of the wavelet coefficients or latent space).

Provided within the scope of this method are learning image data and associated learning assignments onto which the device is to nominally map the learning image data. Furthermore, a specification for the reduction of the level of detail, which is sought, on average, during training, is defined as a hyperparameter. Parameters characterizing the behavior of the trainable pre-processing unit of the device are now optimized for the aims that the device maps the learning image data onto the learning assignments, and at the same time, the reduction of the level of detail which the pre-processing unit performs on the learning image data corresponds, on average, to the specification.

As already mentioned above, the hyperparameter determines which portion of the originally captured details is supplied, on average, to the classifier. During training of the parameters of the pre-processing unit, it is then learned to distribute this specified "ration" of information over the various learning images in such a way that the classifier ultimately provides optimum accuracy. For example, the specification may be that on average the level of detail must be reduced by 50%. Then, at the end of training, a few images may be selected from, for example, one million images, as key images, of which all details are taken into account, while for most other images 95% of the details remain disregarded.

It is to be expected that in the specific use an optimum is established for the hyperparameter which can, for example, be dependent on the architecture and size of the ANN, type, label quality and variability of the training data, the learning rate, and also on the number of pixels in the processed images. This optimum can be obtained via any parameter optimization method.

In a particularly advantageous embodiment, parameters characterizing the behavior of the classifier of the device are additionally optimized to the aim of the device mapping the learning image data onto the learning assignments. As explained above, the pre-processing device on the one hand and the classifier on the other hand can be trained "hand-in-hand", for example simultaneously, alternately or otherwise in alternation. The classifier can learn, for example as part of its training progress, which details in images are particularly relevant for deciding between classes, and the pre-processing unit can learn to work out these details in the image data.

In a further particularly advantageous embodiment, the optimization of the parameters characterizing the behavior of the classifier is additionally also directed to the aim of the level of detail of the image data used by the classifier being as low as possible. As a result, the tendency of the classifier to make decisions about class assignments more dependent on slowly changing portions of the image is increased. This additionally increases robustness in relation to noise and to "adversarial examples".

Both the device and the method can in particular be wholly or partially computer-implemented. For this reason, the disclosure also relates to a computer program comprising machine-readable instructions which, when executed on one or more computers, upgrade the computer or computers to the previously described device and/or cause said computer(s) to carry out the method described above. In this sense, control devices for vehicles and embedded systems for technical devices, which are also capable of executing machine-readable instructions, are to be regarded as computers.

The disclosure also relates to a machine-readable data carrier and/or to a download product comprising the computer program. A download product is a digital product that can be transmitted via a data network, i.e. downloadable by a user of the data network, and which can be supplied for immediate downloading in an on-line store for example.

Furthermore, a computer can be equipped with the computer program, with the machine-readable data carrier, or with the download product.

Further measures improving the disclosure are explained in more detail below, together with the description of the preferred embodiments of the invention, with reference to figures.

DETAILED DESCRIPTION

Figure 1:
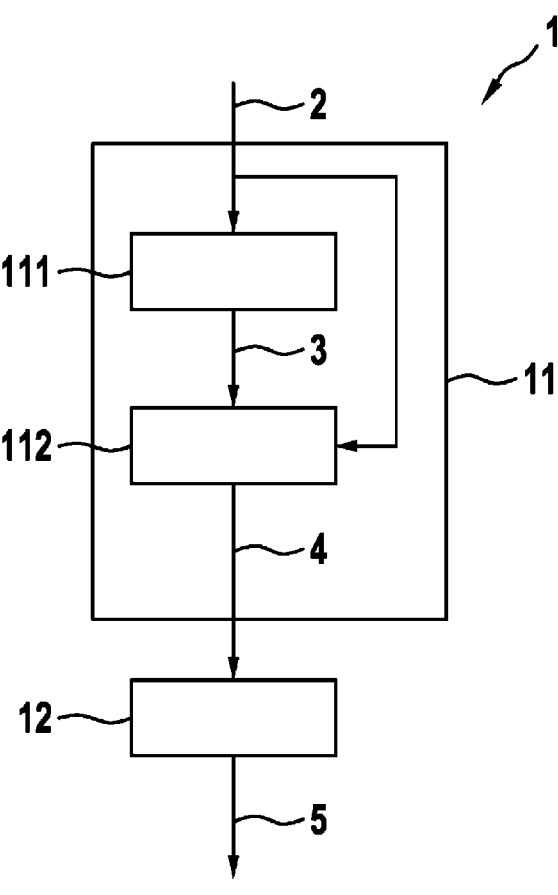
FIG. 1 shows an embodiment of the device 1.

FIG. 1 shows an embodiment of the device 1 for the classification of image data 2. The device 1 comprises a trainable pre-processing unit 11 and a classifier 12.

The pre-processing unit 11 receives image data 2 from any source and in a block 111 determines on the basis of these image data 2 at least one specification 3 regarding the extent to which the level of detail of the image data 2 is to be reduced. In block 112, the level of detail of the image data 2 is reduced according to this specification 3, such that detail-reduced image data 4 result. These detail-reduced image data 4 are mapped onto an assignment 5 to one or more classes of a specified classification.

Figure 2:
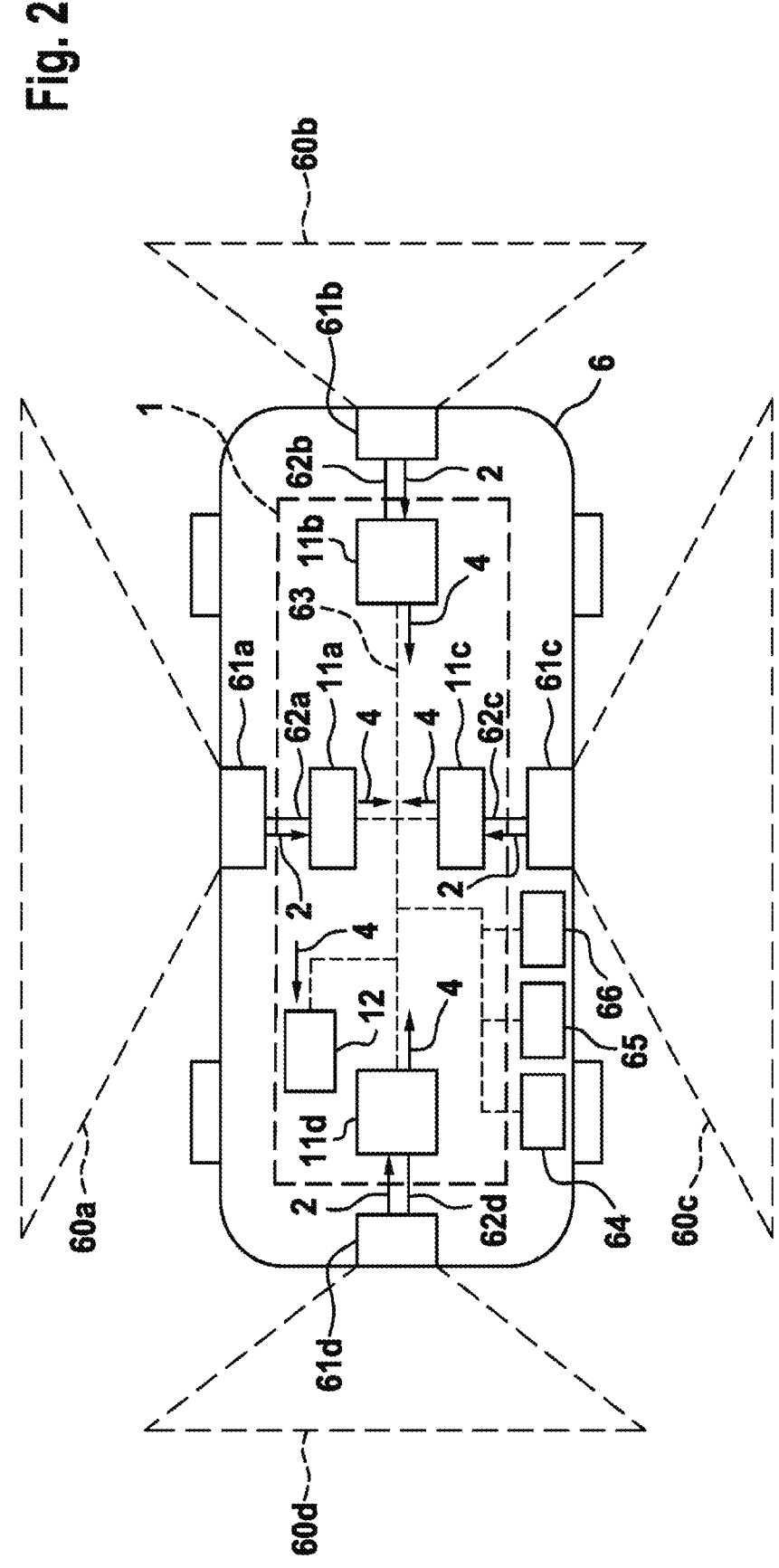
FIG. 2 shows a further embodiment of the device 1 in a vehicle 6.

FIG. 2 shows a further embodiment of the device 1 which is installed in a vehicle 6. The vehicle 6 has four cameras 61a-61d that monitor regions 60a-60d of the surroundings of the vehicle 6. Each of these cameras 61a-61d supplies image data 2 via a dedicated broadband connection 62a-62d to a pre-processing unit 11a-11d that is associated in each case. All pre-processing units 11a-11d are connected to a central bus system 63 of the vehicle 6, which is also used by further on-board systems 64-66 of the vehicle 6. The pre-processing units 11a-11d supply highly compressed detailed-reduced image data 4 to the trainable classifier 12. In this way, the classifier 12 can process the most important details of the image data 2 without the full data stream of the image data 2 having to be transmitted via the bus system 63 of the vehicle 6, the bus system not being designed for this purpose. For the sake of clarity the feedback from the classifier to actuators of the vehicle 6 is not shown in FIG. 2.

Figure 3A:
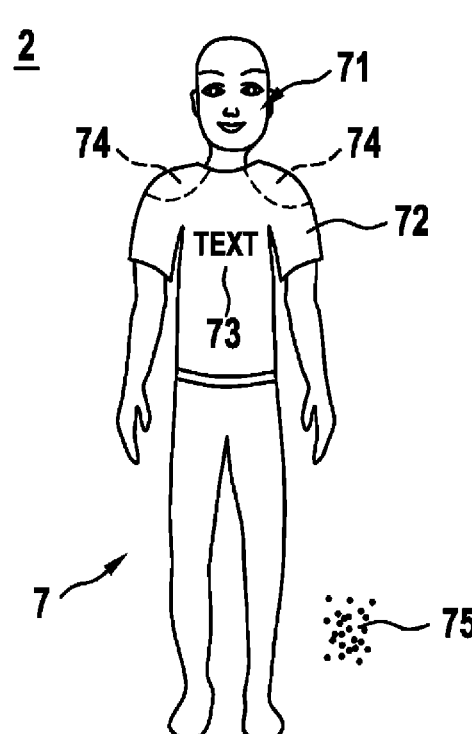
FIG. 3 shows a schematic example of detail reduction taking the example of a pedestrian 4.

FIG. 3 shows an example of the detail reduction taking the example of a pedestrian 7. FIG. 3a is a schematic view of image data 2 provided by a camera. The pedestrian 7 has a face 71 with pronounced facial features. He is also wearing a t-shirt 72 with an inscription 73 and shoulder pads 74.

All these details are not relevant to the important recognition that this is a pedestrian. Certain details could even distract a classifier 12. Thus, for example, certain features in the face 71, or a tattered state of the t-shirt 72, could cause the classifier 12 to incorrectly classify the pedestrian 7 as a scarecrow. Likewise, the shoulder pads 74 could cause the classifier 12 to classify the pedestrian 7 as a display dummy. Both cases would be disadvantageous for the pedestrian 7, because a system for at least partially automated driving would assume that only slight material damage occurs in the event of a collision with a scarecrow or a display dummy, and in the case of doubt would give preference to this collision over a collision with another vehicle. The same could happen if the incorrect classification is deliberately brought about by a manipulative "adversarial" pattern 75 in the image data 2, for example by a semi-transparent sticker on the camera lens.

Figure 3B:
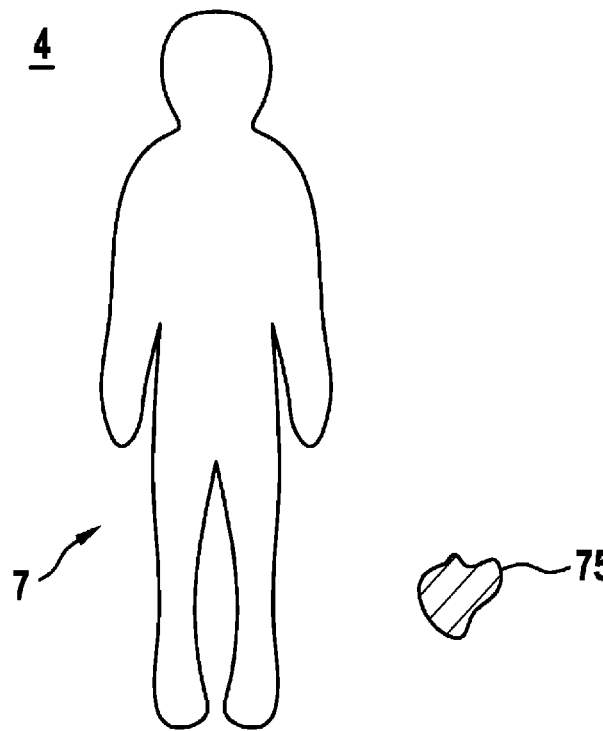

FIG. 3b shows the detail-reduced image data 4. In this case, it can now be seen only abstractly that this is a pedestrian 7. All further details are omitted, such that additional bandwidth and computing capacity are no longer required for their processing. The "adversarial" pattern 75 is also smoothed to form a homogeneous spot and thus rendered harmless.

Figure 4:
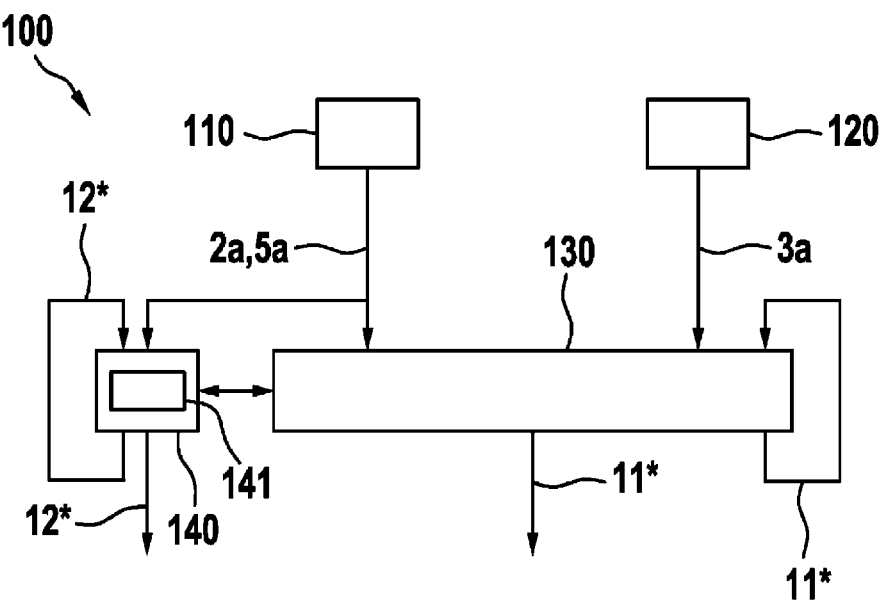
FIG. 4 shows an embodiment of the method 100.

FIG. 4 shows an embodiment of the method 100 for training the device 1. In step 110, learning image data 2a and associated learning assignments 5a are provided. In step 120, a specification 3a for reducing the level of detail in the learning image data 2a, which is sought on average, is determined. In step 130, parameters 11* characterizing the behavior of the trainable pre-processing unit 11, 11a-11d of the device 1 are optimized for the aims of the device 1 imaging the learning image data 2a onto the learning assignments 5a, and at the same time the reduction in the level of detail that the pre-processing unit 11, 11a-11d performs on the learning image data 2a corresponds on average to the specification 3a.

In addition, in step 140 in this embodiment, parameters 12* which characterize the behavior of the classifier 12 of the device 1 are also optimized for the aim of the device 1 mapping the learning image data 2a onto the learning assignments 5a. This training is dovetailed with the training 130 of the parameters 11* of the pre-processing unit 11, 11a-11d.

According to block 141, optimization 140 of the parameters 12* of the classifier 12 is additionally also directed at the aim of the level of detail of the image data 2 used by the classifier 12 being as low as possible.

The invention claimed is:

1. A system for classification of image data, the system comprising:

at least one computer, the at least one computer being configured to implement:

a trainable pre-processing unit configured to (i) receive the image data, (ii) transform the image data into a representation in a working space as a linear combination of basic functions of the working space characterized by a set of coefficients, (iii) retrieve, from a trained relationship, based on the image data, at least one specification regarding which of the coefficients are to be reduced in terms of magnitude or eliminated, the at least one specification defining an extent to which a level of detail of the image data is to be reduced, and (iv) (iii) generate detail-reduced image data by reducing or eliminating the coefficients of the representation in accordance with the at least one specification; and a trainable classifier configured to map the detail-reduced image data onto an assignment to one or more classes of a specified classification.

2. The system according to claim 1, wherein the pre-processing unit and the classifier are jointly trained as a common artificial neural network ("ANN").

3. The system according to claim 1, wherein:

the pre-processing unit is connected via a dedicated broadband connection to at least one image source carried by a vehicle, the pre-processing unit is connected to the classifier via a bus system of the vehicle, and the bus system is also used by further on-board systems of the vehicle.

4. The system according to claim 1, wherein:

the pre-processing unit is configured to determine the representation in the working space as a linear combination of wavelets; and the wavelets are characterized by a set of wavelet coefficients.

5. The system according to claim 1, wherein the pre-processing unit is configured to retrieve, as the at least one specification, a numerical fraction of the coefficients which are to be reduced in magnitude or eliminated.

6. The system according to claim 5, wherein the pre-processing unit is configured to determine the numerical fraction of the coefficients which are to be reduced in magnitude or eliminated, using entropy of the image data.

7. The system according to claim 1, wherein the pre-processing unit is configured to:

retrieve a dimensionality for a latent space of an autoencoder as the working space using the image data from the trained relationship, and transform the image data into the working space using the autoencoder.

* * * * *